US010448251B1

(12) United States Patent
Maria

(10) Patent No.: US 10,448,251 B1
(45) Date of Patent: Oct. 15, 2019

(54) BLOCKCHAIN AUTHENTICATION FOR MOBILE NETWORK ACCESS

(71) Applicant: AT&T Mobility II LLC, Atlanta, GA (US)

(72) Inventor: Arturo Maria, Bellevue, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 16/288,285

(22) Filed: Feb. 28, 2019

(51) Int. Cl.
| | |
|---|---|
| *H04W 12/06* | (2009.01) |
| *H04L 9/06* | (2006.01) |
| *G06F 16/27* | (2019.01) |
| *H04W 12/08* | (2009.01) |

(52) U.S. Cl.
CPC ............ *H04W 12/06* (2013.01); *G06F 16/27* (2019.01); *H04L 9/0637* (2013.01); *H04L 9/0643* (2013.01); *H04W 12/08* (2013.01); *H04L 2209/38* (2013.01)

(58) Field of Classification Search
CPC ....... H04W 12/06; H04W 12/08; G06F 16/27; H04L 9/0637; H04L 9/0643; H04L 2209/38
See application file for complete search history.

(56) References Cited

U.S. PATENT DOCUMENTS

| | | | |
|---|---|---|---|
| 10,026,118 B2 | 7/2018 | Castinado et al. | |
| 10,123,202 B1 * | 11/2018 | Polehn ................. | H04W 8/183 |
| 10,135,835 B1 | 11/2018 | Kandel et al. | |
| 10,194,320 B1 * | 1/2019 | Egner ................... | H04W 12/08 |
| 10,299,128 B1 * | 5/2019 | Suthar .................. | H04W 12/06 |
| 2018/0048738 A1 | 2/2018 | Hinds | |
| 2018/0109541 A1 | 4/2018 | Gleichauf | |
| 2018/0114220 A1 | 4/2018 | Ekberg | |
| 2018/0248845 A1 | 8/2018 | Irwan et al. | |
| 2018/0294966 A1 | 10/2018 | Hyun et al. | |
| 2018/0331837 A1 | 11/2018 | Uhr et al. | |
| 2018/0375869 A1 | 12/2018 | Qiu | |

FOREIGN PATENT DOCUMENTS

| | | |
|---|---|---|
| KR | 20180054530 | 5/2018 |
| WO | 2018124856 | 7/2018 |

OTHER PUBLICATIONS

Jover et al., dHSS—distributed Peer-to-Peer implementation of the LTE HSS based on the bitcoin/namecoin architecture, IEEE International Conference on Communications Workshops (ICC), May 23-27, 2016, 6 pages.

* cited by examiner

*Primary Examiner* — Dinh Nguyen
(74) *Attorney, Agent, or Firm* — Kilpatrick Townsend & Stockton LLP

(57) ABSTRACT

Certain aspects of this disclosure relate to authentication of mobile devices to the public wireless network using blockchains. In some aspects, a system includes a database configured to store blockchains for authenticating mobile devices to access a public wireless network. Each blockchain can be associated with a mobile device. A processor can receive a blockchain record from a mobile device and grant access of the mobile device to the public wireless network when the blockchain record corresponds to the blockchain stored in the database. A new block can be appended to a blockchain to produce a new blockchain for authenticating access of the mobile device to the public wireless network at a future time. The current blockchain record is stored in the mobile device and accessed for authentication to the public wireless network.

20 Claims, 4 Drawing Sheets

BLOCKCHAIN AUTHENTICATION FOR MOBILE NETWORK ACCESS

TECHNICAL FIELD

This disclosure generally relates to communication security for a public wireless network, such as an LTE cellular network. More specifically, this disclosure relates to security mechanisms that automatically update and store a blockchain for a mobile device over time to provide a necessary security level for cellular network access without having to rely on a subscriber identity module (SIM).

BACKGROUND

Authentication in most mobile phone networks is based on a challenge response mechanism using pre-shared keys provided by a subscriber identity module (SIM). SIM keys are provided by the SIM manufacturer to carriers. The carriers store these keys in the home subscriber server (HSS) network element repository. The SIM keys are known to the mobile device and to the carrier thus each key is used as a pre-shared key. SIM keys are never shared over the air.

When a mobile device attaches to the network, the mobility management entity (MME) sends an authentication request to the HSS. The HSS provides an authentication vector to the MME. The authentication vector consists of a random number and an expected response. The expected response is calculated using the AES algorithm and the pre-shared key. If the mobile device provides a response, which matches the expected response, then authentication is validated and access is granted to the network. The user has no control over this process since a SIM key is provided by the carrier and the SIM manufacturer.

SUMMARY

In some aspects, a system includes a database configured to store blockchains for authenticating mobile devices to access a public wireless network. A blockchain is associated with a mobile device. A processor is communicatively coupled to the database and the public wireless network. A non-transitory memory device includes instructions that are executable by the processor to cause the processor to perform operations. The operations include receiving a blockchain record from the mobile device, wherein the blockchain record corresponds to a current blockchain associated with the mobile device. The operations also include granting access of the mobile device to the public wireless network when the blockchain record corresponds to the blockchain associated with the mobile device. The operations further include appending a new block to the current blockchain to produce a new blockchain associated with the mobile device for authenticating access of the mobile device to the public wireless network at a future time. The operations further include storing the new blockchain in the database as the blockchain associated with the mobile device and providing a new blockchain record for the new blockchain to the mobile device.

In some aspects a method includes receiving, by a processor, a blockchain record from a mobile device and comparing, by the processor, the blockchain record to a blockchain associated with the mobile device in a database. The method further includes granting, by the processor, access by the mobile device to the public wireless network when the blockchain record corresponds to the blockchain associated with the mobile device stored in the database. The method also includes appending, by the processor, a new block to a current blockchain to produce a new blockchain associated with the mobile device for authenticating access of the mobile device to the public wireless network at a future time. The method further includes storing, by the processor, the new blockchain in the database as the blockchain associated with the mobile device and providing, by the processor, a new blockchain record for the new blockchain to the mobile device.

In some aspects, a non-transitory computer-readable medium includes instructions that are executable by a mobile device for causing the mobile device to perform operations for authenticating access to a public wireless network. The operations include accessing a blockchain record stored in the mobile device and sending the blockchain record to a mobility management entity (MME) for a public wireless network in order to authenticate access to the public wireless network. The operations further include connecting to the public wireless network in response to being authenticated when the blockchain record matches a blockchain stored in a database communicatively connected to the MME. The instructions also include receiving and storing a new blockchain record created by appending a new block to the blockchain, the new blockchain record for authenticating access of the mobile device to the public wireless network at a future time.

BRIEF DESCRIPTION OF THE FIGURES

These and other features, aspects, and advantages of the present disclosure are better understood when the following Detailed Description is read with reference to the accompanying drawings.

DETAILED DESCRIPTION

Figure 1:
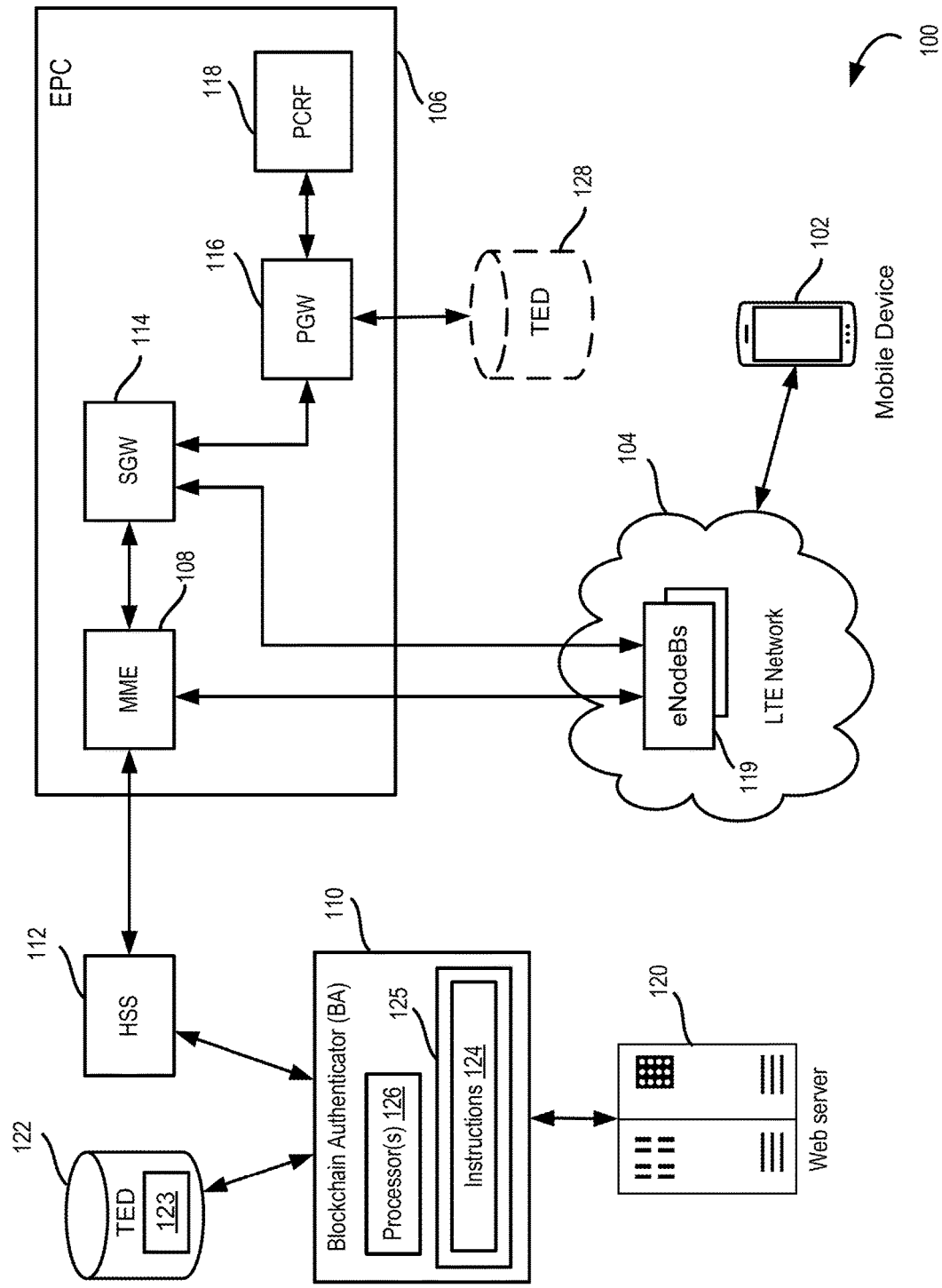
FIG. 1 is a block diagram depicting a system including blockchain authentication according to some aspects of the present disclosure.

Certain aspects of this disclosure relate to authentication of mobile devices to the public wireless network without requiring a SIM. Certain aspects of this disclosure ensure that only the user knows or has access to the identity of the relevant mobile device, in contrast to authentication based in SIMs, where many parties know the pre-shared keys. For example, with SIM-based authentication, the SIM manufacturer and the carrier have access to the pre-shared keys. The use of blockchains to authenticate mobile devices eliminates the vulnerability associated with shared keys.

In some examples, every time a user performs an action that causes the mobile device to authenticate access to the carrier network, a new cryptographic block is created logging the transaction and this new block becomes the next block in the mobile device's blockchain. In other examples, new blocks are created at some other time, but in either case the cryptographic log is not able to be deleted unless a new blockchain is legitimately created and constitutes a record of transactions in the carrier network.

In one example, a system includes a database configured to store blockchains for authenticating mobile devices to access a public wireless network. Each blockchain can be associated with a mobile device. The system includes a processor communicatively coupled to the database and a non-transitory memory device with instructions that are executable by the processor. The instructions cause the processor to receive a blockchain record from a mobile device, compare the blockchain record to a blockchain stored in the database and grant access of the mobile device to the public wireless network when the blockchain record corresponds to the blockchain associated with the mobile device stored in the database. The processor causes a new block to be added to a current blockchain to produce a new blockchain associated with the mobile device for authenticating access of the mobile device to the public wireless network at a future time. The new block can be produced by logging the access to the network, or it can be produced at another time or based on other criteria. The new blockchain is then stored in the database and the new blockchain record is provided to the mobile device for future use.

In some examples, the user of the mobile device can access a secure Web interface to request a blockchain update, or enter a setting that describes how, when, or how and when new blocks are generated and appended to the blockchain for the mobile device. In some examples, the current blockchain record is stored in a blockchain element in the mobile device. The blockchain element can be implemented, as an example, in a blockchain chip. In some example, the blockchain can be stored in flash memory.

Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

FIG. 1 depicts a system 100 that includes blockchain authentication of mobile device according to some aspects of the disclosure. System 100 can provide communication services, including voice, video and/or data services to mobile devices, such as mobile device 102. In some aspects, mobile device 102 is a smart mobile communication device that includes a cellular transceiver for communicating with a cellular system using a public wireless network, such as a long-term evolution (LTE) network 104, and that includes a short distance wireless transceiver, such as a Wi-Fi transceiver, for communicating with a wireless local area network (LAN). While a 4G LTE wireless network is shown and described in FIG. 1 as an example, blockchain authentication as described herein can be used with other types of public wireless networks, such as 5G carrier networks.

System 100 of FIG. 1 can include mobile devices such as mobile device 102, a primary LTE radio access technology (RAT) network 104, and a secondary RAT network (not shown), such as a universal mobile telecommunications system (UMTS), a global system for communications (GSM) network, evolution data only (EVDO) network, or a code division multiple access (CDMA) network. The system 100 can further include an evolved package core (EPC) 106, providing services using a mobility management entity (MME) 108, including session state management, user tracking, and authentication services. MME 108 in EPC 106 authenticates users using blockchain authentication as described herein by accessing the blockchain authenticator (BA) 110 through home subscriber server (HSS) 112, which also provides a central database that contains user-related and subscription-related information. EPC 106 also includes serving gateway (SGW) 114, which routes data packets through the LTE network 104, packet gateway (PGW) 116, which acts as the interface between the LTE network 104 and the Internet, and policy and charging rules function (PCRF) 118, which provides policy enforcement and tracks subscriber charges.

Still referring to FIG. 1, LTE network 104 includes multiple evolved node base stations (eNodeBs) to communicate with mobile devices 102 via cellular towers (now shown). Each eNodeB 119 includes a radio network controller, which enables carrying many traffic types including real-time circuit-switched to IP-based packet switched traffic and voice. The LTE network's eNodeBs provide connectivity between each mobile device 102 and the EPC 106. In some aspects, MME 108 can perform the function of a control node. For example, the MME 108 can perform functions such as idle mode tracking and paging procedure including retransmissions. The MME 108 can also choose a serving gateway for the mobile device 102 such as at the initial attach and at time of intra-LTE handover involving node relocation. MME 108 and HSS 112 can be accessed when the mobile device attempts to re-register to access the EPC 106 through LTE network 104. SGW 114 can route and forward user data packets, while also acting as the mobility anchored device for inter-eNodeB handovers and as the anchored device for mobility between LTE and other technologies. MME 108 and SGW 114 both communicate with the eNodeBs 119.

Continuing with FIG. 1, blockchain authenticator (BA) 110 communicates with MME 108 through HSS 112. The purpose of the BA is to authenticate mobile devices requesting to be attached to the carrier radio access network and to gain access to services provided by the EPC 106 such as gateway services to the Internet or services such as voice-over-LTE (VoLTE). Rather than using an authentication vector based on pre-shared SIM keys and a challenge/response mechanism, the BA maintains and stores hashed credentials derived from a blockchain algorithm. According to some aspects of the disclosure, the credentials are generated using a blockchain key-pair and the hashed values for the first block in the chain are based on personal information such as name, address, date of birth, etc. of the user. In some aspects, the hashed credentials are initially generated by the user, for example, using an interface provided by Web server 120. The credentials are stored by the BA 110 in a carrier blockchain database, in this example, a trusted entity database (TED) 122. The blockchain 123 stored in TED 122 can also be initialized by the carrier or provider of the mobile device at the time of device activation. The BA compares the provided blockchain values with the expected values based on user key pairs. If the values match then the user is allowed access to the network.

The BA 110 of FIG. 1 replaces the HSS and MME functions historically used to provide authentication using SIMs with a central authenticator based on blockchain algorithms. Computer program code instructions 124 are stored in a non-transitory memory device 125 in the BA 110. These instructions, when executed by processor 126 in BA 110, carry out the blockchain algorithm, run an interface to Web server 120, communicate with TED 122, and provide blockchain authentication values to the MME through the HSS as appropriate to authenticate mobile devices. Each mobile device maintains a copy of the current blockchain record to use for authentication, as will be discussed in more detail below with respect to FIG. 2. The carrier can rely on one central blockchain database, such as TED 122, or alternatively, can take advantage of the added security of redundant blockchains at multiple nodes by maintaining additional redundant blockchain databases, such as TED 128, accessed over the Internet or other external network through PGW 116. It is also possible to federate a blockchain database across multiple carriers for roaming purposes.

Figure 2:
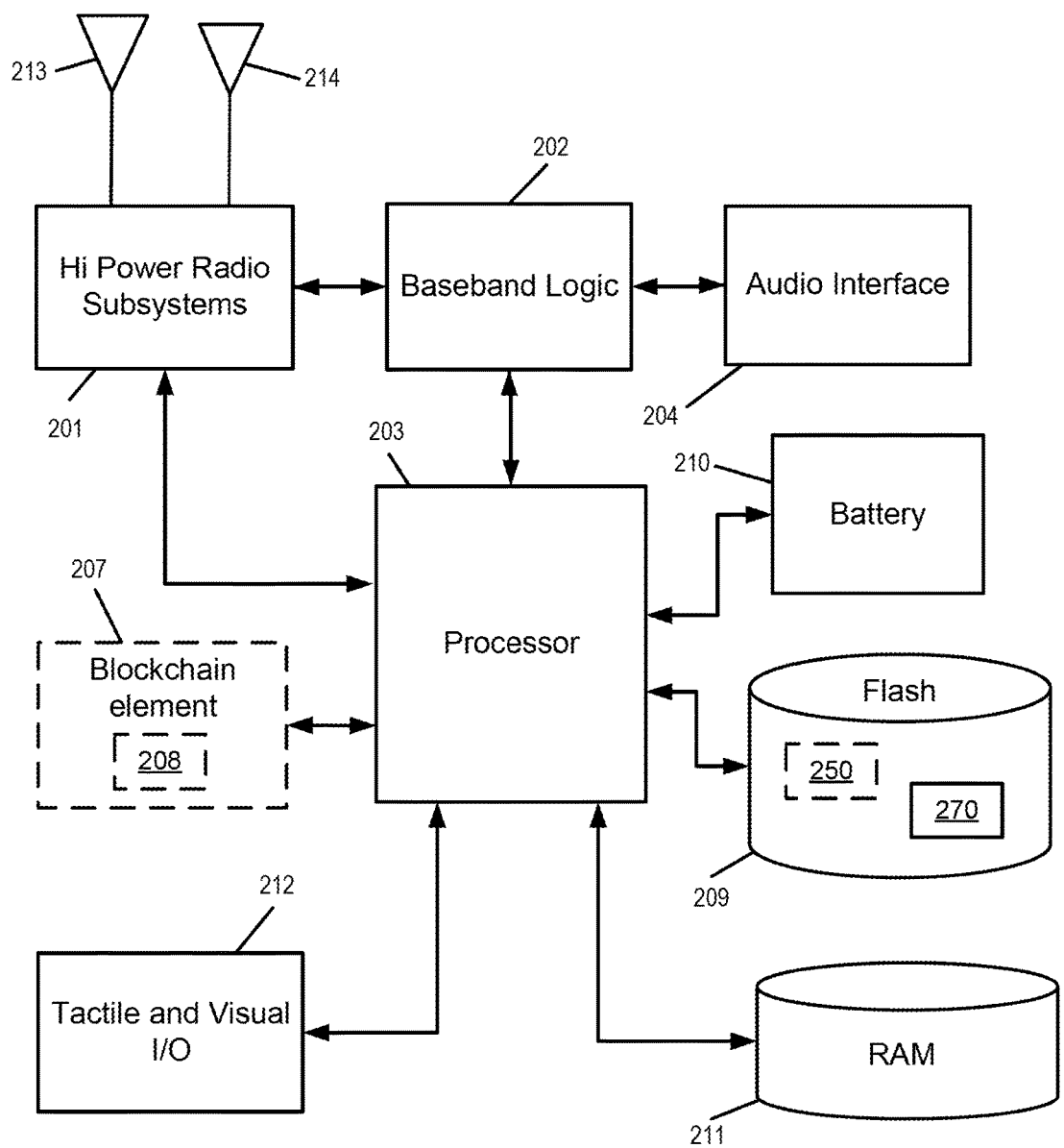
FIG. 2 is a block diagram depicting a mobile computing device that implements blockchain authentication according to some aspects of the present disclosure.

FIG. 2 is a block diagram depicting the mobile device 116 that implements blockchain authentication according to some aspects of the present disclosure. The mobile device 116 includes a high power (hi power) radio subsystems block 201, a baseband logic block 202, a processor 203, and an audio interface block 204. In the example of FIG. 2, a blockchain element (BE) 207 is shown as operatively connected to the processor. In some aspects, the blockchain element is implemented as a chip including blockchain algorithms, a dedicated processor, and storage for blockchain records 208. In some aspects a blockchain record includes a blockchain with hash values derived from a public-private key pair assigned to the mobile device is stored in the blockchain element. In other aspects, some or all of these functions can be provided by processor 203, with the current blockchain or blockchain record being stored in a secure enclave within processor 203. Also included in mobile device 116 is flash storage 209, a battery 210, and random-access memory (RAM) 211. The RAM 211 can include various devices and possibly memory dedicated to specific purposes such as graphics. A portion of RAM 211 can be used to store the data currently being viewed on the display of the computing device. The display (not shown) is part of tactile and visual input/output (I/O) block 212. Within the high power radio subsystems block 201, the transmitted and received information is converted to and from the radio frequencies (RF) of the various carrier types, and filtering using baseband or intermediate frequency circuitry is applied. Radio subsystems for Wi-Fi local area network communication are included in this block. The device's main antenna system 213 is connected to the radio subsystems block 201. The device also includes a Wi-Fi antenna 214. In the baseband logic block 202, basic signal processing occurs, e.g., synchronization, channel coding, decoding and burst formatting.

Still referring to FIG. 2, the audio interface block 204 handles voice as well as analog-to-digital (A/D) and D/A processing. It also produces output through a speaker (not shown). The processor 203 and supporting control logic (not shown) coordinates the aforementioned blocks. The functions of the aforementioned blocks are directed and controlled by the main processor, which can be a general-purpose microprocessor, digital signal processor (DSPs), application specific integrated circuit (ASIC). Supporting control logic can include various types of signal conditioning circuitry, including analog-to-digital converters, digital-to-analog converters, input/output buffers, etc.

The flash storage 209 shown in FIG. 2 includes at least one array of non-volatile memory cells. RAM 211 includes at least one array of dynamic random-access memory (DRAM) cells. The content of the flash memory may be pre-programmed and write protected thereafter, whereas the content of other portions of the RAM may be selectively modified and/or erased. The flash memory therefore, is non-transitory computer-readable medium that is used to store operating system software and application programs (apps). RAM may be used to temporarily store code, a MAC address, encryption keys, or other data. Flash storage 209 can also be used instead of the blockchain element 207 or the secure enclave to store a blockchain or blockchains as well as computer program code instructions 250, which implement blockchain authentication as described herein. For example, if a mobile device is an older smartphone, or not a smartphone, but rather a tablet computer, a blockchain element or secure enclave might not be available, in which case flash storage can be used. Applications (apps) 270 installed in flash storage 209 can optionally make use of the blockchain for the mobile device to implement two-factor authentication.

A memory device storing computer program code instructions executable by the processing device can include any type of memory device that retains stored information when powered off. In the example of FIG. 2, such a memory device can be the flash memory 209 or can be included in the blockchain element 207. A non-transitory, computer-readable medium can include electronic, optical, magnetic, or other storage devices capable of providing the processing device with computer-readable instructions or other program code. Such a medium may store the instructions on a server prior to installation in or programming of a blockchain authentication mechanism. Non-limiting examples of a computer-readable medium include (but are not limited to) magnetic disk(s), memory chip(s), read-only memory (ROM), random-access memory ("RAM"), an ASIC, a configured processing device, optical storage, or any other medium from which a computer processing device can read instructions. Appropriate computer program code instructions can implement blockchain authentication as described herein on any type of mobile device, including but not limited to a notebook computer, desktop computer, wearable computer, or tablet computer, in additional to a mobile device as shown in FIG. 2 such as a smartphone.

As an example of the operation of the various network entities and mobile terminal described above, a user (or the provider of the mobile device at the user's direction) causes the authentication value of the initial blockchain to derived using a public-private key-pair assigned the mobile device and personal information such as name, address, birth date, etc. of the user. The authentication value is encrypted using hashing algorithms and stored under the authority of the user in a cryptographic blockchain. When the mobile device attaches to the public wireless network and requests authentication, the mobile device access the blockchain element 207, flash memory 209, or other storage and provides the blockchain record as an authentication value. The blockchain authentication value is transmitted from the eNodeB 119 to the MME 108. The MME 108 forwards the provided blockchain value to BA 110 through HSS 112. The BA may be implemented as a stand-alone server or may reside in a network server that is also used for other purposes. The BA 110 receives the blockchain record in order to validate the transaction and authenticate the mobile device to the public wireless network 104. At this point a user would have previously stored a hashed identity key (blockchain with at least the initial block) in the BA repository for future authentication purposes. The user, through the mobile device 102 treats the repository used by the BA 110 as a trusted entity. In this example the repository is trusted entity database (TED) 122.

The BA 110 running executable instructions 124 residing in non-transitory storage device 125 compares the value provided by the mobile phone with the value contained in the TED records. If the values match, the user is granted access to the public wireless network 104. In one example, the BA appends a new block or blocks to the blockchain record contained in the TED for logging purposes. In this example, every time the mobile device requests service from a network element or a carrier service supported by public wireless network 104, the TED database is used to validate the blockchain request and appends new blocks to the chain logging the transaction. The blockchain blocks are stored in the TED database for future purposes. In this example, the blockchain blocks are never deleted and constitute a permanent record of all authentication requests and services provided to the user. Applications in the mobile terminal can also optionally use the blockchain for two-factor authentication.

Figure 3:
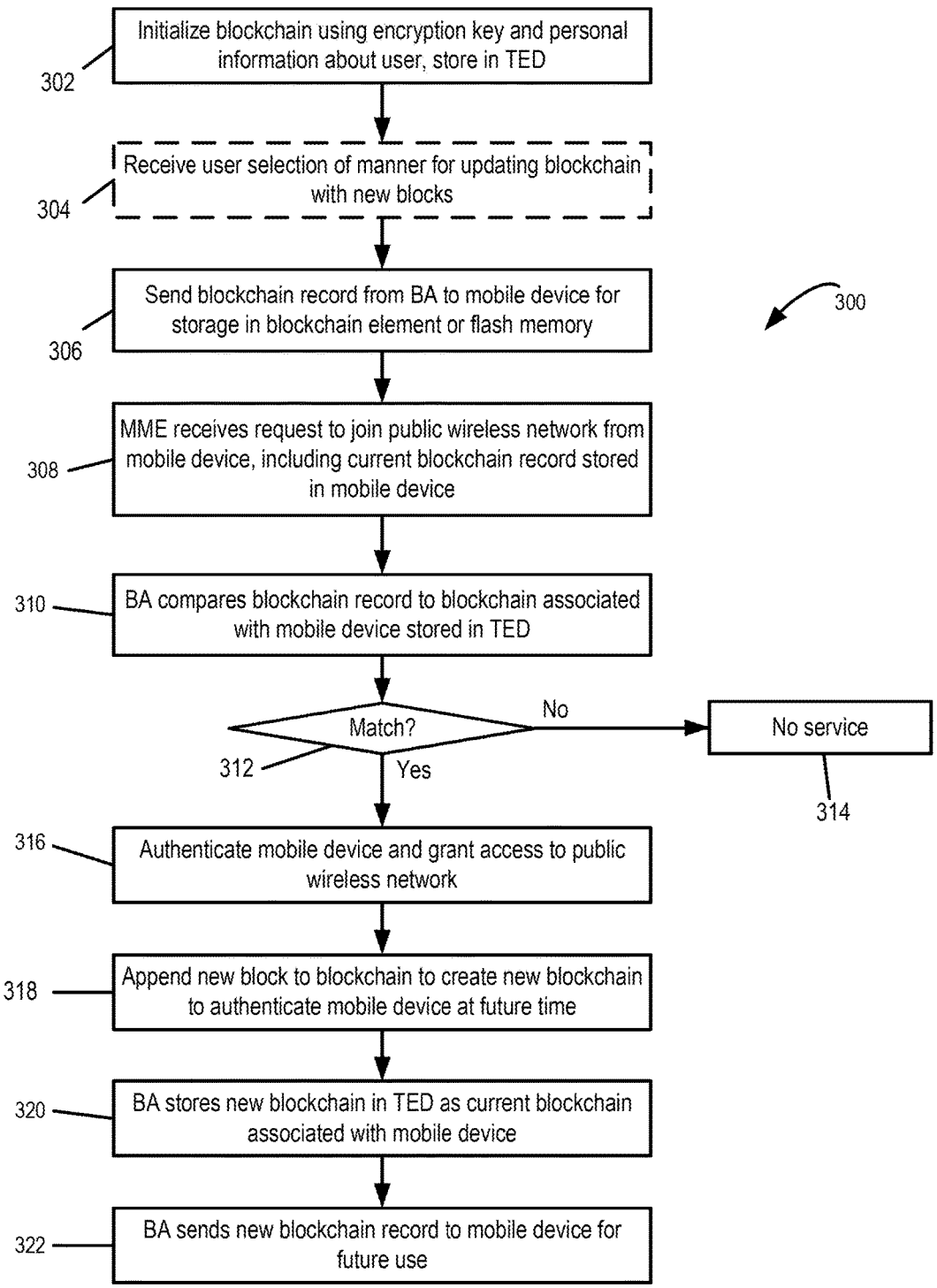
FIG. 3 is a flowchart illustrating a process for providing blockchain authentication according to some aspects of the present disclosure.

FIG. 3 depicts a flowchart illustrating, as an example, process 300 for providing blockchain authentication to users according to certain aspects. Process 300 will be described with reference to the system of FIG. 1 as an example. Process 300 of FIG. 3 begins at block 302 where the blockchain for a mobile device is initialized using the user's private encryption key and personal information about the user. The blockchain is then stored in TED 122 by BA 110. Optionally, at block 304, the system can receive user selection of a manner for updating the blockchain with new blocks. For example, this selection can be received through Web server 120 and BA 110 can implement this preference. The user may select, for example, having a new block added at some time interval, after some specific number of network accesses, or immediately. The block can be created by encrypting information other than details of network accesses, such as locations, dates, or information from social media. At block 306, the blockchain record is sent from BA 110 to mobile device 102 for storage in the device's blockchain element or other storage location. In this description, the blockchain record generally refers to the copy of the blockchain stored on the device and the term blockchain refers to the blockchain stored in the TED.

Still referring to FIG. 3, at block 308, MME 108 receives a request to join public wireless network 104 from mobile device 102. The request includes the current blockchain record stored in the mobile device. The MME passes the request to BA 110 through HSS 112. At block 310, the BA compares the blockchain record to the blockchain associated with mobile device as stored in TED 122. If the records to not match at block 312, service will not be provided to the mobile device and a "no service" message will appear at block 314 on the mobile device, much as such a message appears when a SIM cannot be authenticated. If there is a match at block 312, the mobile device is authenticated and granted access to the public wireless network at block 316.

Continuing with FIG. 3, at block 318, BA 110 appends a new block to the blockchain to create a new blockchain to authenticate the mobile device at future time. The new block can be created with information from the network access that has just taken place, so that the blockchain documents all network access by the mobile device over time. Alternatively, a new block can be created at some future time based on a schedule, a prompt, or other selections made by the user, for example, using a Web interface provided by Web server 120. At block 320, BA 110 stores the new blockchain in TED 122 as the current blockchain associated with the mobile device. At block 322, BA 110 sends the new blockchain record to mobile device to be stored for future use.

Figure 4:
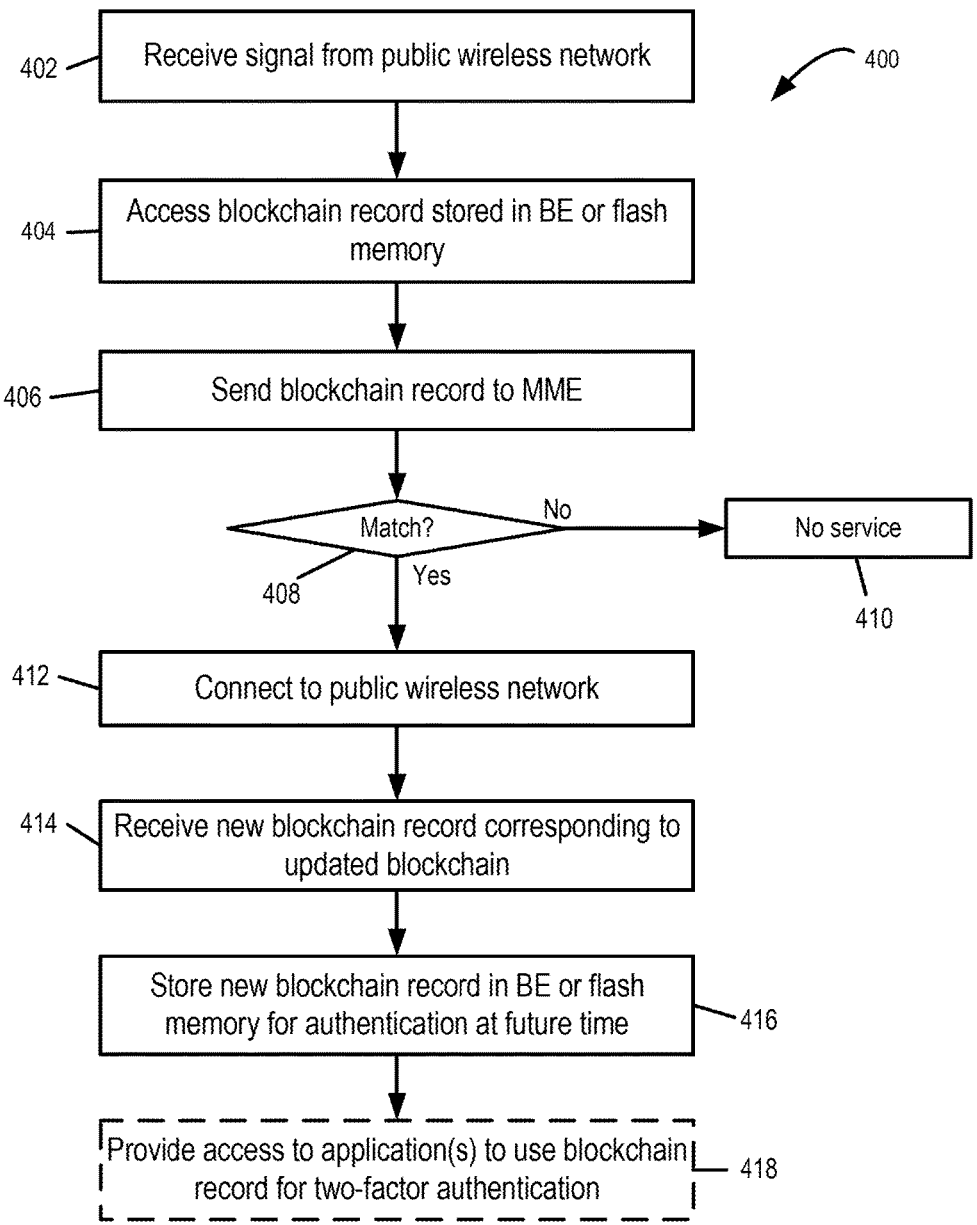
FIG. 4 is a flowchart showing the operation of a mobile device implementing blockchain authentication according to some aspects of the present disclosure.

FIG. 4 depicts a flowchart showing the operation of mobile device 102 connecting to a public wireless network such as network 104 using blockchain authentication according to some aspects. At block 402 of process 400, mobile device 102 receives a signal from public wireless network 104. At block 404, mobile device 102 accesses the current blockchain record stored, for example, in BE 207 or flash memory 209. At block 406, processor 203 uses high power radio subsystems 201 to send the blockchain record to the MME over network 104. The blockchain record is compared to the blockchain stored in the carrier's systems at block 408. If the two do not match, service is not granted and mobile device 102 displays the "no service" message at block 410, much as such a message appears when a SIM cannot be authenticated. If the records match at block 408, the mobile device is authenticated and connects to the public wireless network at block 412.

Still referring to FIG. 4, at block 414, mobile device 102 receives a new blockchain record corresponding to an updated blockchain. As previously discussed, this new blockchain includes at least one additional block, which may document the network access that has occurred. Alternatively, this new blockchain may be based on other criteria. At block 416, processor 203 stores the new blockchain record for authentication at a future time. Optionally at block 418, processor 203 can grant an application or applications 270 installed on mobile device 102 access to the blockchain record to make use of the blockchain record for two-factor authentication.

Unless specifically stated otherwise, throughout this specification terms such as "processing," "computing," or the like refer to actions or processes of a computing device, such as one or more computers or a similar electronic computing device or devices that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel. Messaging or signaling described as taking place between two entities can take place directly or indirectly through intervening entities. Components described as connected or connectable can be connected through intervening components.

The foregoing description of the examples, including illustrated examples, of the subject matter has been presented only for the purpose of illustration and description and is not intended to be exhaustive or to limit the subject matter to the precise forms disclosed. Numerous modifications, adaptations, and uses thereof will be apparent to those skilled in the art without departing from the scope of this subject matter. The illustrative examples described above are given to introduce the reader to the general subject matter discussed here and are not intended to limit the scope of the disclosed concepts.

The invention claimed is:

1. A system comprising:
   a database configured to store a plurality of blockchains for authenticating a plurality of mobile devices to access a public wireless network, a blockchain associated with a mobile device;
   a processor communicatively coupled to the database and the public wireless network; and
   a non-transitory memory device comprising instructions that are executable by the processor to cause the processor to perform operations comprising:
   receiving a blockchain record from the mobile device, wherein the blockchain record corresponds to a current blockchain associated with the mobile device;
   granting access by the mobile device to the public wireless network when the blockchain record corresponds to the blockchain associated with the mobile device;
   appending a new block to the current blockchain to produce a new blockchain associated with the mobile device for authenticating access of the mobile device to the public wireless network at a future time;
   storing the new blockchain in the database as the blockchain associated with the mobile device; and
   providing a new blockchain record for the new blockchain to the mobile device.

2. The system of claim 1 wherein the blockchain record includes a hash value derived using an encryption key assigned to the mobile device.

3. The system of claim 2 wherein an initial block in the blockchain is defined by applying the encryption key to personal information about a user of the mobile device.

4. The system of claim 1 wherein the new block is appended to the current blockchain each time the mobile device is authenticated for access to the public wireless network.

5. The system of claim 1 wherein the new block is appended to the current blockchain according to a selection received from a user of the mobile device through a Web interface communicatively coupled to the processor.

6. The system of claim 1 wherein the database comprises a plurality of redundant databases.

7. The system of claim 6 wherein the public wireless network is a long-term evolution (LTE) network and wherein at least one of the plurality of redundant databases is accessed through a packet gateway within an evolved package core.

8. A method comprising:
   receiving, by a processor, a blockchain record from a mobile device;
   comparing, by the processor, the blockchain record to a blockchain associated with the mobile device in a database;
   granting, by the processor, access by the mobile device to the public wireless network when the blockchain record corresponds to the blockchain associated with the mobile device stored in the database;
   appending, by the processor, a new block to a current blockchain to produce a new blockchain associated with the mobile device for authenticating access of the mobile device to the public wireless network at a future time;
   storing, by the processor, the new blockchain in the database as the blockchain associated with the mobile device; and
   providing, by the processor, a new blockchain record for the new blockchain to the mobile device.

9. The method of claim 8 wherein the blockchain record includes a hash value derived using an encryption key assigned to the mobile device.

10. The method of claim 9 further comprising applying the encryption key to personal information about a user of the mobile device to produce an initial block for the blockchain associated with the mobile device.

11. The method of claim 8 wherein the new block is appended to the current blockchain each time the mobile device accesses the public wireless network.

12. The method of claim 8 wherein the new block is appended to the current blockchain according to a selection, the method further comprising receiving the selection through a Web interface.

13. The method of claim 8 wherein the database comprises a plurality of redundant databases.

14. The method of claim 13 wherein the public wireless network is a long-term evolution (LTE) network and wherein at least one of the plurality of redundant databases is accessed through a packet gateway within an evolved package core.

15. A non-transitory computer-readable medium that includes instructions that are executable by a mobile device for causing the mobile device to perform operations for authenticating access to a public wireless network, the operations comprising:
   accessing a blockchain record stored in the mobile device;
   sending the blockchain record to a mobility management entity (MME) for a public wireless network in order to authenticate access to the public wireless network;
   connecting to the public wireless network in response to access to being authenticated when the blockchain record matches a blockchain stored in a database communicatively connected to the MME;
   receiving a new blockchain record created by appending a new block to the blockchain, the new blockchain record for authenticating access of the mobile device to the public wireless network at a future time; and
   storing the new blockchain record.

16. The non-transitory computer-readable medium of claim 15 wherein the blockchain record includes a hash value derived using an encryption key assigned to the mobile device.

17. The non-transitory computer-readable medium of claim 16 wherein an initial block in the blockchain is defined by applying the encryption key to personal information about a user of the mobile device.

18. The non-transitory computer-readable medium of claim 15 wherein the new block is appended to the blockchain each time the mobile device accesses the public wireless network.

19. The non-transitory computer-readable medium of claim 15 wherein the operations further comprising providing access to the blockchain record for at least one application in the mobile device.

20. The non-transitory computer-readable medium of claim 15 wherein the blockchain record is stored in a blockchain element within the mobile device.

* * * * *